(12) United States Patent
Feng et al.

(10) Patent No.: US 10,360,469 B2
(45) Date of Patent: Jul. 23, 2019

(54) REGISTRATION METHOD AND APPARATUS FOR 3D IMAGE DATA

(71) Applicant: Samsung Electronics Co., Ltd., Suwon-si (KR)

(72) Inventors: Xuetao Feng, Beijing (CN); Biao Wang, Beijing (CN); Hao Feng, Beijing (CN); Hongwei Zhang, Beijing (CN); Changkyu Choi, Seongnam-si (KR); Jaejoon Han, Seoul (KR); Jungbae Kim, Seoul (KR); Lujin Gong, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 426 days.

(21) Appl. No.: 14/994,688

(22) Filed: Jan. 13, 2016

(65) Prior Publication Data

US 2016/0210751 A1 Jul. 21, 2016

(30) Foreign Application Priority Data

Jan. 15, 2015 (CN) .......................... 2015 1 0019073
Dec. 15, 2015 (KR) ........................ 10-2015-0178967

(51) Int. Cl.
*G06K 9/00* (2006.01)
*G06K 9/46* (2006.01)
(Continued)

(52) U.S. Cl.
CPC ....... *G06K 9/4604* (2013.01); *G06K 9/00214* (2013.01); *G06K 9/00288* (2013.01);
(Continued)

(58) Field of Classification Search
CPC . G06T 17/00; G06T 7/33; G06T 2207/10024; G06T 7/73; G06K 9/4671;
(Continued)

(56) References Cited

U.S. PATENT DOCUMENTS 8,320,620 B1 * 11/2012 Cohen ................. G06K 9/6206
382/103
2003/0117392 A1 6/2003 Harvill
(Continued)

FOREIGN PATENT DOCUMENTS

KR 10-2009-0089401 A 8/2009

OTHER PUBLICATIONS

Amberg et al.,Optimal Step Nonrigid ICP Algorithms for Surface Registration, 2007, IEEE CVPR 2007, pp. 1-8, AAPA via IDS.*
(Continued)

*Primary Examiner* — Vu Le
*Assistant Examiner* — Guillermo M Rivera-Martinez
(74) *Attorney, Agent, or Firm* — NSIP Law

(57) ABSTRACT

Provided is a 3D registration method and apparatus that may select a key point from among plural points included in 3D target data, based on a geometric feature or a color feature of each of the plural points, may adjust a position of the selected key point of the 3D target data based on features of, or a distance between, a key point of the 3D source data and the selected key point of the 3D target data, may calculate reliabilities of plural key points of the 3D source data based on respective features of at least one key point of the 3D target data determined to correspond to the plural key points of the 3D source data, and may generate 3D registration data by performing 3D registration between the 3D source data and the 3D target data based on the calculated reliabilities.

30 Claims, 8 Drawing Sheets

(51) Int. Cl.
*G06K 9/48* (2006.01)
*G06K 9/62* (2006.01)
*G06T 7/33* (2017.01)

(52) U.S. Cl.
CPC .......... *G06K 9/4652* (2013.01); *G06K 9/481* (2013.01); *G06K 9/6201* (2013.01); *G06K 9/6206* (2013.01); *G06T 7/33* (2017.01); *G06T 2200/04* (2013.01); *G06T 2207/10028* (2013.01); *G06T 2207/30201* (2013.01)

(58) Field of Classification Search
CPC .... G06K 9/00523; G06K 9/46; G06K 9/4652; G06K 9/481
See application file for complete search history.

(56) References Cited

U.S. PATENT DOCUMENTS

| | | | | |
|---|---|---|---|---|
| 2005/0249434 | A1* | 11/2005 | Xu | G06K 9/6211 382/294 |
| 2007/0031028 | A1* | 2/2007 | Vetter | G06K 9/00208 382/154 |
| 2009/0028403 | A1* | 1/2009 | Bar-Aviv | G06F 19/321 382/128 |
| 2010/0045701 | A1* | 2/2010 | Scott | G01S 5/163 345/633 |
| 2011/0075916 | A1* | 3/2011 | Knothe | G06K 9/00201 382/154 |
| 2011/0153362 | A1* | 6/2011 | Valin | G06Q 20/105 705/3 |
| 2012/0194504 | A1 | 8/2012 | McCloskey | |
| 2013/0050214 | A1 | 2/2013 | Free | |
| 2013/0201187 | A1 | 8/2013 | Tong et al. | |
| 2014/0003705 | A1* | 1/2014 | Taguchi | G06T 7/344 382/154 |
| 2014/0037161 | A1* | 2/2014 | Rucker | A61B 5/0033 382/128 |
| 2014/0043329 | A1 | 2/2014 | Wang et al. | |
| 2015/0254857 | A1* | 9/2015 | Huang | G06T 3/0068 382/154 |
| 2016/0189381 | A1* | 6/2016 | Rhoads | G06T 7/33 382/103 |
| 2017/0337711 | A1* | 11/2017 | Ratner | H04N 19/176 |

OTHER PUBLICATIONS

Li et al.,Global Correspondence Optimization for Non-Rigid Registration of Depth Scans, 2008, Eurographics Symposium on Geometry Processing 2008, vol. 27 (2008), No. 5, pp. 1-10.*

Bellekens et al.,A Survey of Rigid 3D Pointcloud Registration Algorithms, 2014, AMBIENT 2014 : The Fourth International Conference on Ambient Computing, Applications, Services and Technologies, pp. 8-13.*

Amberg, Brian, et al. "Optimal Step Nonrigid ICP Algorithms for Surface Registration." Computer Vision and Pattern Recognition, 2007. CVPR'07. IEEE Conference on. IEEE, 2007.

* cited by examiner

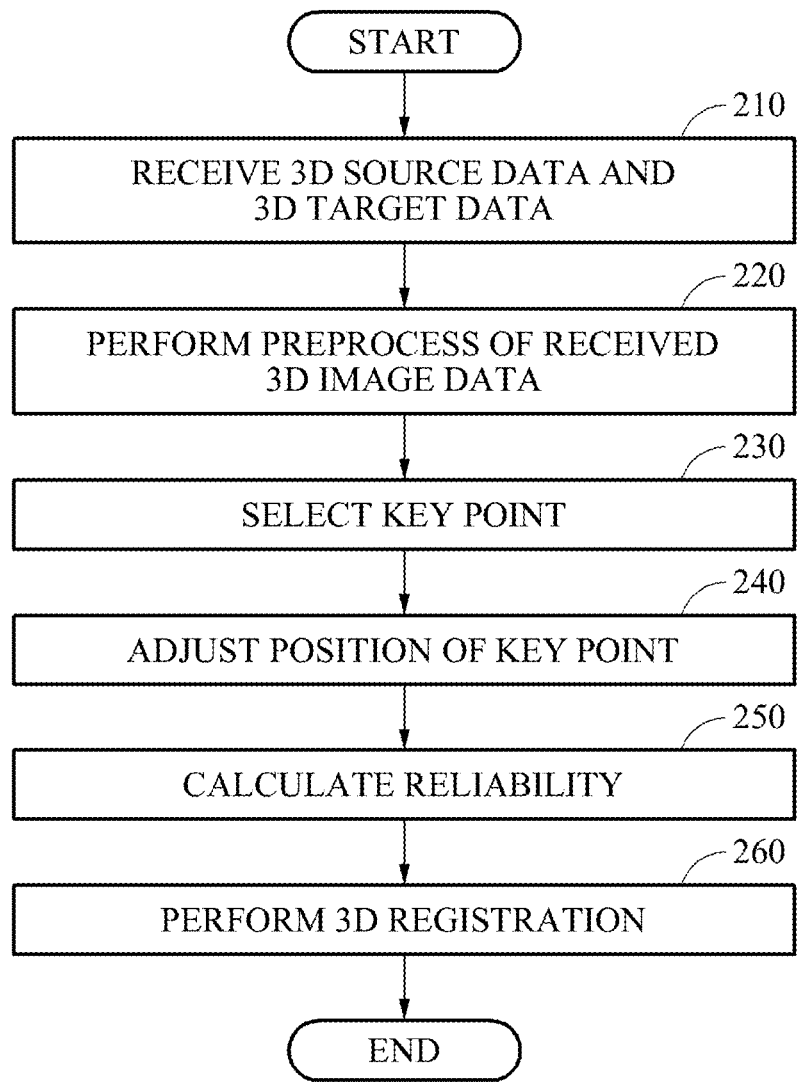

310

REGISTRATION METHOD AND APPARATUS FOR 3D IMAGE DATA

CROSS-REFERENCE TO RELATED APPLICATION(S)

This application claims the benefit under 35 U.S.C 119(a) of Chinese Patent Application No. 201510019073.X, filed on Jan. 15, 2015 in the State Intellectual Property Office of the People's Republic of China, and claims the benefit under 35 U.S.C 119(a) of Korean Patent Application No. 10-2015-0178967, filed on Dec. 15, 2015 in the Korean Intellectual Property Office, the entire disclosures of which are incorporated herein by reference for all purposes.

BACKGROUND

1. Field

The following description relates to a method and apparatus for processing a three-dimensional (3D) image, and more particularly, may relate to a method and apparatus for registration of 3D image data.

2. Description of Related Art

Three-dimensional (3D) image data is widely used in a variety of fields. 3D registration relates to technology of processing such 3D image data. A correspondence relationship or a transformation relationship between points of two or more sets of 3D image data may be generated based on the 3D registration. The generated correspondence relationship or transformation relationship is used to align the two or more sets of 3D image data. 3D registration is applicable to reconfiguring an object or a scene, identifying and modeling a human face, a robot navigation, identifying an object, and the like.

In general, two techniques are employed to perform 3D registration. The first technique performs the 3D registration by segmenting 3D image data based on a position of a key point of 3D image data and by transforming a point within a segmented block based on a transformation of the key point. The second technique relates to a method of aligning 3D image data based on a non-alignment iterative closest point (ICP) algorithm, and performs the 3D registration based on a smoothness and a key point.

SUMMARY

This Summary is provided to introduce a selection of concepts in a simplified form that are further described below in the Detailed Description. This Summary is not intended to identify key features or essential features of the claimed subject matter, nor is this Summary intended to be used as an aid in determining the scope of the claimed subject matter.

One or more embodiments provide a method for three-dimensional (3D) registration, the method including selecting a key point from among plural points included in 3D target data, based on a geometric feature or a color feature of each of the plural points, adjusting a position of the selected key point of the 3D target data based on features of, or a distance between, a key point of the 3D source data and the selected key point of the 3D target data, calculating reliabilities of plural key points of the 3D source data based on respective features of plural key points of the 3D target data determined to correspond to the plural key points of the 3D source data, and generating 3D registration data by performing 3D registration between the 3D source data and the 3D target data based on the calculated reliabilities, for aligning the 3D source data to match the 3D target data.

The selecting of the key point may include generating a feature vector based on a determined geometric feature or a color feature of the selected key point.

The adjusting of the position may include calculating a feature distance between a point present in an a neighbor area of the selected key point of the 3D target data and the key point of the 3D source data, based on a determined geometric feature or a color feature of the selected key point, and adjusting the position of the selected key point based on a position of a point of the 3D source data corresponding to a determined minima of the feature distance.

The calculating of the reliabilities may include calculating respective feature distances, based on geometric or color features, between the plural key points of the 3D source data and the plural key points of the 3D target data, and calculating respective reliabilities based on the respective feature distances.

A reliability of a corresponding key point of the 3D source data may be based on a determined feature of the selected point of the 3D target data with the adjusted position.

The method may further include aligning the 3D source data based on at least one key point of the 3D target data, generating a transformation matrix between the aligned 3D source data and the 3D target data, and generating the 3D registration data by performing the 3D registration between the aligned 3D source data and the 3D target data based on the transformation matrix.

The aligning of the 3D source data may include generating first transformed data by performing rigid alignment of the 3D source data based on a smoothness of the at least one key point, and generating second transformed data by performing non-rigid alignment of the first transformed data based on at least one of the smoothness, the at least one key point, and the reliabilities.

The generating of the transformation matrix may include generating a primary candidate transformation matrix between the second transformed data and the 3D target data, and determining a final transformation matrix among a plurality of secondary candidate transformation matrices, which are based on the primary candidate transformation matrix, based on respective distances between the plurality of secondary candidate transformation matrices.

The method may further include generating one of the secondary candidate transformation matrices based on a distance between a point of the 3D target data and a point of the 3D source data that is transformed based on at least two of another one of the secondary candidate transformation matrices, a smoothness, and the at least one key point.

The performing of the 3D registration may include performing smoothing for the 3D source data based on a distance between a point of the 3D source data that is transformed based on the transformation matrix and a point of the 3D target data corresponding to the point of the 3D source data or a smoothness.

The method may further include preprocessing at least one of the 3D source data and the 3D target data before the performing of the 3D registration.

The preprocessing may include performing hole filling of the 3D target data, and the generating of the 3D registration data may include performing the 3D registration based on the 3D source data and the preprocessed 3D target data, and storing the generated 3D registration data representing a transformation of the 3D source data, as image data, in a memory.

The performing of the 3D registration may include aligning the 3D source data with respect to the 3D target data, and determining a first transformation between the aligned 3D source data and the 3D target data in correspondence with: $E_1(X):=E_s(X)+\hat{B}E_f(X)$, wherein X, as a matrix, represents the first transformation between the aligned 3D source data and the 3D target data when $E_1(X)$ is minimized, with $E_s(X)$ representing a function with respect to a limit of smoothness, $\hat{B}$ being a weighted matrix representing determined reliabilities of key points of the 3D source data, and $E_f(X)$ representing an energy function with respect to a mapping of key points of the 3D source data and key points of the 3D target data according to X.

The aligning of the 3D source data may be a rigid aligning of the 3D source date with respect to the 3D target data and the determining of the first transformation includes a non-rigid aligning for the 3D source data.

One or more embodiments provide a method for three-dimensional (3D) registration, the method including acquiring first transformed data by performing rigid alignment of 3D source data based on a key point and 3D target data, acquiring second transformed data by performing non-rigid alignment of the first transformed data based on the key point and the 3D target data, generating a transformation matrix between the second transformed data and the 3D target data, and generating 3D registration data by performing 3D registration between the 3D source data and the 3D target data based on the transformation matrix for aligning the 3D source data to match the 3D target data.

The key point may be a point that is selected from among plural points included in the 3D target data and the 3D source data, based on respective geometric features or color features of each of the plural points.

The acquiring of the second transformed data may include performing the non-rigid alignment based on a smoothness, a reliability of a key point of the 3D source data, or the key point, and the reliability may be calculated based on a feature of a key point of the 3D target data corresponding to the key point of the 3D source data.

The generating of the transformation matrix may include generating a primary candidate transformation matrix between the second transformed data and the 3D target data, and determining a final transformation matrix among a plurality of secondary candidate transformation matrices, which are based on the generated primary candidate transformation matrix, based on respective distances between the plurality of secondary candidate transformation matrices.

The method may further include generating one of the secondary candidate transformation matrices based on a distance between a point of the 3D target data and a point of the 3D source data that is transformed based on at least two of another one of the secondary candidate transformation matrices, a smoothness, or the key point.

The performing of the 3D registration may include performing smoothing for the 3D source data based on a distance between a point of the 3D source data that is transformed based on the transformation matrix and a point of the 3D target data corresponding to the point of the 3D source data or a smoothness.

One or more embodiments provide an apparatus for three-dimensional (3D) registration, the apparatus including at least one processing device configured to select a key point from among plural points included in 3D target data, based on a geometric feature or a color feature of each of the plural points, to adjust a position of the selected key point of the 3D target data based on features of, or a distance between, a key point of the 3D source data and the selected key point of the 3D target data, to calculate reliabilities of plural key points of the 3D source data based on respective features of at least one key point of the 3D target data determined to correspond to the plural key points of the 3D source data, to generate 3D registration data by performing 3D registration between the 3D source data and the 3D target data based on the calculated reliabilities, representing a transformation of the 3D source data, as image data.

The apparatus may further include a data preprocessor configured to perform preprocessing of the 3D source data and the 3D target data before the performing of the 3D registration.

Other features and aspects will be apparent from the following detailed description, the drawings, and the claims.

BRIEF DESCRIPTION OF THE DRAWINGS

FIG. 2 is a flowchart illustrating a 3D registration method, according to one or more embodiments.

Throughout the drawings and the detailed description, the same reference numerals may refer to the same or like elements. The drawings may not be to scale, and the relative size, proportions, and depiction of elements in the drawings may be exaggerated for clarity, illustration, and convenience.

DETAILED DESCRIPTION

Figure 1A:
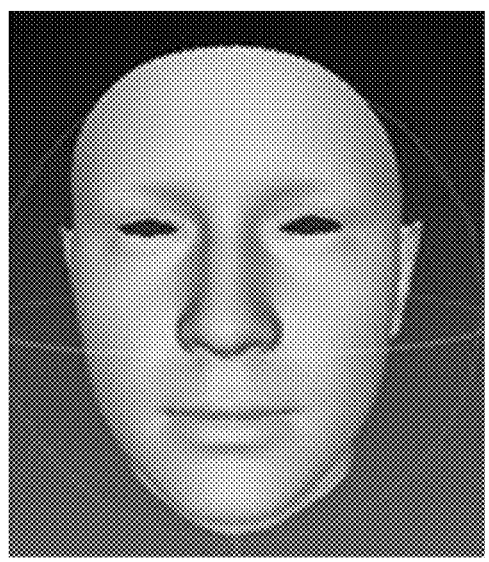
FIGS. 1A, 1B, and 1C illustrate examples of three-dimensional (3D) source data and 3D target data considered by a 3D registration apparatus according to one or more embodiments.

The following detailed description is provided to assist the reader in gaining a comprehensive understanding of the methods, apparatuses, and/or systems described herein. After an understanding of the present disclosure, various changes, modifications, and equivalents of the methods, apparatuses, and/or systems described herein may then be apparent to one of ordinary skill in the art. The sequences of operations described herein are merely non-limiting examples, and are not limited to those set forth herein, but may be changed as will be apparent to one of ordinary skill in the art, with the exception of operations necessarily occurring in a certain order, after an understanding of the present disclosure. Also, descriptions of functions and constructions that may be understood, after an understanding of differing aspects of the present disclosure, may be omitted in some descriptions for increased clarity and conciseness.

Various alterations and modifications may be made to embodiments, some of which will be illustrated in detail in the drawings and detailed description. However, it should be understood that these embodiments are not construed as limited to the disclosure and illustrated forms and should be understood to include all changes, equivalents, and alternatives within the idea and the technical scope of this disclosure.

Terms used herein are to merely explain specific embodiments, thus it is not meant to be limiting. A singular expression includes a plural expression except when two expressions are contextually different from each other. For example, as used herein, the singular forms "a", "an", and "the" are intended to include the plural forms as well, unless the context clearly indicates otherwise. Herein, a term "include" or "have" are also intended to indicate that characteristics, figures, operations, components, or elements disclosed on the specification or combinations thereof exist. The term "include" or "have" should be understood so as not to pre-exclude existence of one or more other characteristics, figures, operations, components, elements or combinations thereof or additional possibility. In addition, though terms such as first, second, A, B, (a), (b), and the like may be used herein to describe components, unless indicated otherwise, these terminologies are not used to define an essence, order, or sequence of a corresponding component but used merely to distinguish the corresponding component from other component(s).

Unless otherwise defined, all terms including technical and scientific terms used herein have the same meaning as commonly understood by one of ordinary skill in the art to which respective embodiments belong. It will be further understood that terms, such as those defined in commonly-used dictionaries, should be interpreted as having a meaning that is consistent with their meaning in the context of the relevant art and the present disclosure and will not be interpreted in an idealized or overly formal sense unless expressly so defined herein.

When describing the examples with reference to the accompanying drawings, like reference numerals refer to like constituent elements and a repeated description related thereto may be omitted. When it is determined that a detailed description related to an understood or previously discussed operation or configuration may make a purpose of a subsequent embodiment unnecessarily ambiguous in describing the embodiment, such a detailed description may be omitted.

Figure 1B:
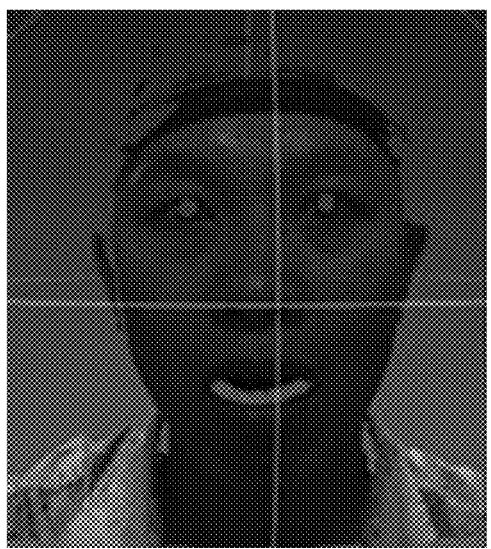
Figure 1C:
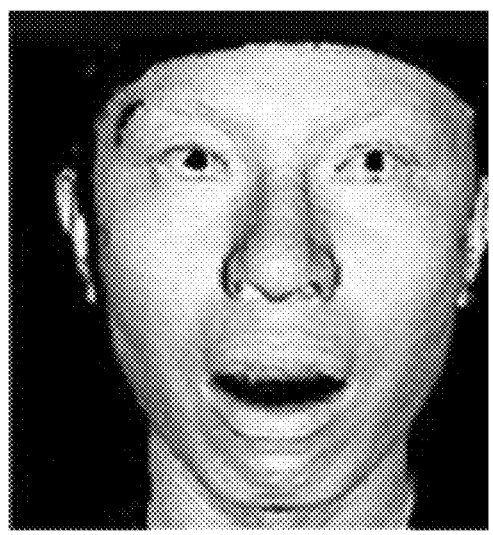

FIGS. 1A, 1B, and 1C illustrate examples of three-dimensional (3D) source data and 3D target data considered by a 3D registration apparatus according to one or more embodiments. The 3D registration apparatus receives at least one set of 3D image data. The 3D image data may be provided in a form of a point cloud, a depth map, and a 3D grid, for example. Herein, the 3D target data and the 3D source data are used to perform 3D registration as 3D image data.

In an embodiment, the 3D registration apparatus may generate a correspondence relationship between 3D target data and 3D source data by performing 3D registration. The 3D registration apparatus may generate a transformation relationship about a transformation from the 3D source data to the 3D target data.

FIG. 1A illustrates an example of a curved surface of 3D source data without texture or in which a texture has been removed, FIG. 1B illustrates an example of 3D target data, and FIG. 1C illustrates an example of a curved surface of 3D target data in which a texture has been removed.

The 3D registration apparatus may find a correspondence relationship between 3D source data and 3D target data. Also, the 3D registration apparatus may align the 3D source data based on the correspondence relationship. That is, through registration, the 3D registration apparatus may enable the 3D source data to be matched to the 3D target data by aligning the 3D source data. Here, though the objects illustrated in FIGS. 1A-1C are faces or head objects, embodiments are not limited thereto.

FIG. 2 is a flowchart illustrating a 3D registration method, according to one or more embodiments. In addition, aspects of FIG. 2 will be discussed with reference to FIGS. 6 and 7, which illustrate 3D registration apparatuses, respectively according to one or more embodiments.

In operation 210, the 3D registration apparatus receives 3D source data and 3D target data that are targeted for 3D registration. The 3D registration apparatus may receive two or more sets of 3D image data. As only examples, Receivers 630 and 730 of the 3D registration apparatuses of FIGS. 6 and 7 may respectively receive the 3D source data and/or 3D target data and respectively forward the same to the Graphics Processing device 610 or Graphics Processing device 710, or the 3D source data and/or the 3D target data may be respectively stored to or obtained from memory 620 and memory 720 of the 3D registration apparatuses of FIGS. 6 and 7.

The 3D registration apparatus may accordingly generate a correspondence relationship or a transformation relationship about 3D image data by performing 3D registration with respect to the received two or more sets of 3D image data. For example, the Graphics Processing device 610 of FIG. 6, having one or more processing devices, and the Graphics Processor(s) 714 of FIG. 7, having one or more processing devices, may respectively be configured to perform respective 3D registration according to the methods described in any or all operations of FIG. 2, as only examples, and/or any or all operations of FIG. 4, as only examples, as discussed in greater detail below. Accordingly, hereinafter, an operation of performing such 3D registration will be described in greater detail, noting that references therein to operations performed by a 3D registration apparatus similarly apply to any of the 3D registration apparatuses of FIG. 6 and/or FIG. 7, and/or any other configured electronic device embodiment specifically configured to implement the same.

In operation 220, the 3D registration apparatus may preprocess the received 3D image data. For example, the 3D registration apparatus may perform cutting, hole filling, outlier removing, smoothing, or another preprocessing algorithm included in a point cloud library, for example, with respect to 3D image data. As only an example, the 3D registration apparatus of FIG. 7 illustrates Pre-processor(s) 712, which may receive any of the 3D source data and/or the 3D target data and which may include one or more processing devices configured to first implement such preprocessing on the received 3D source and/or target data before registration is performed by the Graphics Processor(s) 714. In an embodiment, the Pre-processor(s) 712 and the Graphics Processor(s) 714 may be collectively arranged in the Graphics Processing device 710, as only an example. In an embodiment, the 3D source data may be preprocessed and stored in the memory 720, for example, so preprocessing may be performed by the Pre-processor(s) 712 on 3D target data received by the Receiver 730, as only an example. Such preprocessing of the 3D source data and/or 3D target data may also be implemented by the one or more processing devices of the Graphics Processing device 610 of the 3D registration apparatus of FIG. 6. Alternatively, the 3D registration apparatus may not perform preprocessing. That is, the 3D registration apparatus may proceed to operation 230 after performing operation 210. For example, such as with the 3D registration apparatus of FIG. 7, when the preprocessing is not performed the 3D source data and the 3D target data are provided to the Graphic Processor(s) 714 for registration.

In operation 230, the 3D registration apparatus selects a key point from among points included in the 3D image data, e.g., either or both of the 3D source data and the 3D target data. The key point indicates a point having, or determined to have, a special feature about a color or a geometrically special feature among the points included in the 3D image data.

In one example, the 3D registration apparatus automatically selects a key point. As only an example, the 3D registration apparatus may project 3D image data as two-dimensional (2D) image data and measure a key point based on the 2D image data. The 3D registration apparatus may then acquire a position of 3D image data corresponding to the key point measured from the 2D image data by performing a back projection, for example.

Figure 6:
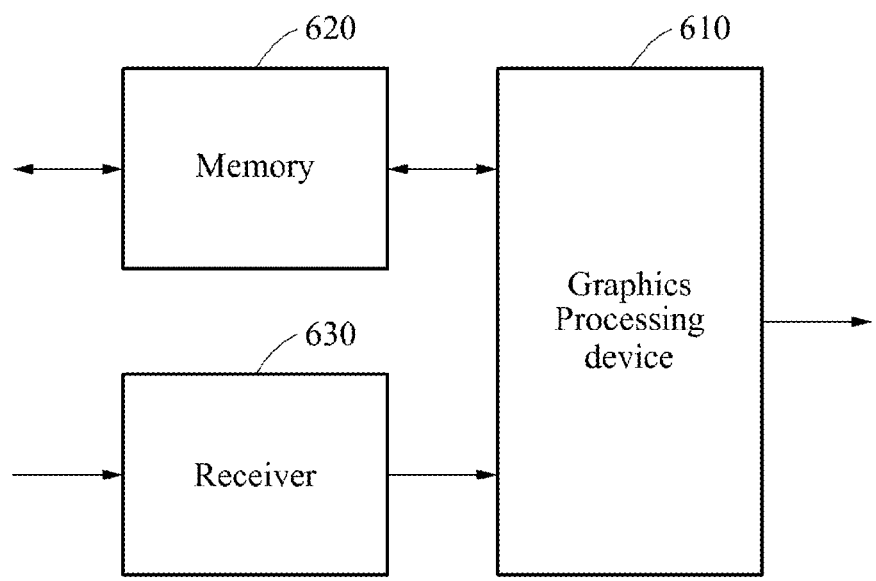
FIG. 6 illustrates a 3D registration apparatus, according to one or more embodiments.
Figure 7:
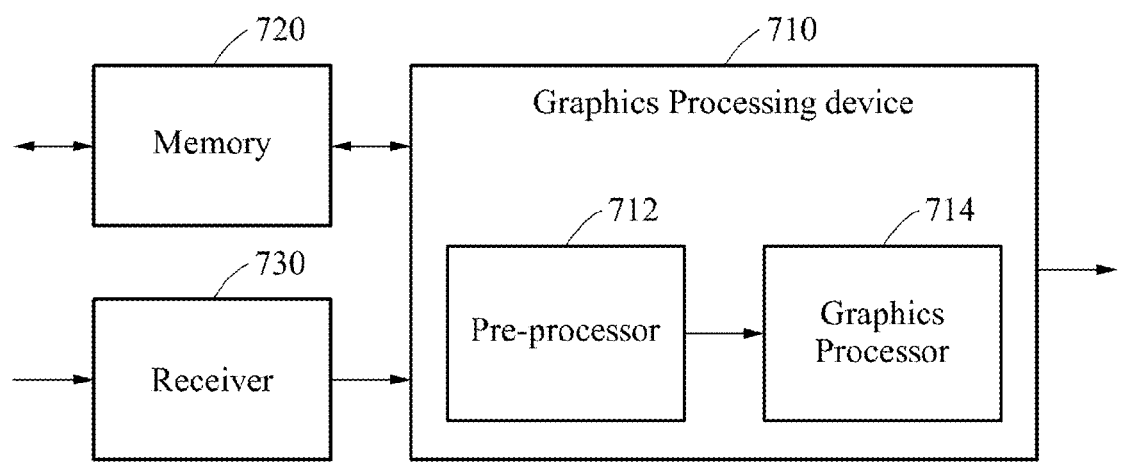
FIG. 7 illustrates a 3D registration apparatus, according to one or more embodiments.

In one example, the 3D registration apparatus selects a key point in response to an input from a user, such as by respectively using user interfaces of the 3D registration apparatuses 600 and 700 of FIGS. 6 and 7. As only an example, the 3D registration apparatus may receive at least one of a position of the key point and an annotation to the key point from the user.

In operation 240, the 3D registration apparatus adjusts a position of the selected key point. The 3D registration apparatus may enhance accuracy of the key point by adjusting the position of the key point. Accordingly, with the adjustment of the position of the key point, the accuracy of the correspondence relationship or the transformation relationship generated by the 3D registration apparatus may increase.

In one example, the 3D registration apparatus may extract a feature for a key point of 3D source data or a feature for a key point of 3D target data. The extracted feature may include a geometric feature or a color feature of the key point. The color feature of the key point indicates a feature about a color of the key point and may include, for example, a local binary pattern (LBP), a scale invariant feature transform (SIFT), or a speed up robust feature (SURF), as only examples. The geometric feature of the key point may include a normal aligned radial feature (NARF), a viewpoint feature histogram (VPH), a fast point feature histogram (FPFH), or a surface entropy (SURE), as only examples. As noted above, such geometric or color features may also be used to select key points of the 3D source data and/or the 3D target data.

The 3D registration apparatus may adjust a position of the key point of the 3D target data based on the extracted feature. For example, the 3D registration apparatus may calculate a feature distance between a point of the 3D source data and a point of the 3D target data based on the geometric feature or the color feature of the key point. The 3D registration apparatus may then adjust the position of the key point based on the calculated feature distance.

As a further example, the 3D registration apparatus may identify a point u, present in a neighbor area $\text{Nei}(l_i^T)$ of an i-th key point $l_i^T$ of 3D target data, having a feature distance closest to a key point $l_i^S$ of 3D source data corresponding to $l_i^T$. The 3D registration apparatus may adjust a position $\hat{l}_i^T$ of a key point of 3D target data to be a position of the point u. That is, the 3D registration apparatus may adjust the position of the key point of 3D target data according to the below Equation 1, as only an example.

$$\hat{l}_i^T = \min_{u \in \text{Nei}(l_i^T)} \|f(u) - f(l_i^S)\| \qquad \text{Equation 1}$$

In Equation 1, f(•) denotes a function of extracting a feature and may include an extraction of a geometric feature or a color feature of a point, such as discussed above. In one example, the 3D registration apparatus may generate a feature vector that represents a feature extracted from a point. The function f(•) may output the feature vector. Accordingly, $\|f(u)-f(l_i^S)\|$ denotes a distance between a feature vector of the point u and a feature vector of the i-th key point $l_i^T$, which is a feature distance between the point u and the i-th key point $l_i^T$.

The 3D registration apparatus may acquire a further accurate correspondence relationship between a key point of 3D source data and a key point of 3D target data by adjusting a position of the key point of the 3D target data corresponding to the key point of the 3D source data.

In an embodiment, the 3D registration apparatus may estimate key points corresponding to 3D source data and 3D target data. Here, the 3D registration apparatus may estimate a key point by performing at least one of a back projection method, a normal shooting method, and a nearest-neighbor algorithm, as only examples.

In one such example, the 3D registration apparatus may determine whether to select a key point of 3D target data corresponding to a key point of 3D source data such that, when a distance between a key point of 3D source data and a key point of 3D target data determined corresponding thereto is greater than or equal to a preset distance, or when an included angle therebetween is greater than a preset angle, the 3D registration apparatus may exclude the key point of the 3D target data from use in the subsequent registration process or from consideration as corresponding to the key point of the 3D source data.

For example, a plurality of objects including a background may be included in the respective 3D image data, and noise may increase in boundaries between objects. Accordingly, in an embodiment, when a key point is present in a boundary between different objects included in 3D target data, the 3D registration apparatus may exclude the key point of the 3D target data. Through this, an effect of an unstable feature of a point present in a boundary against a key point may be reduced and the accuracy of 3D registration may increase accordingly.

As described above, in one or more embodiments, the 3D registration apparatus may enable a key point of 3D source data and a key point of 3D target data to accurately correspond to each other by adjusting a position of a key point, and by estimating or selecting a point corresponding to the key point. Accordingly, through this, the 3D registration apparatus may further precisely perform 3D registration.

In operation 250, the 3D registration apparatus calculates a reliability of the key point. The reliability may be calculated based on a feature distance between a key point of 3D source data and a key point of 3D target data determined corresponding thereto. The reliability and the feature distance may be inversely proportional to each other. In an embodiment, the 3D registration apparatus calculates a reliability of an i-th key point of 3D source data according to the below Equation 2, as only an example.

$$\beta_i = g(d_i) \qquad \text{Equation 2:}$$

In Equation 2, g(•) denotes a monotone decreasing function, and $d_i = \|f(v_j) - f(l_i)\|$ denotes a feature distance between key points $v_j$ and $l_i$ where $l_i$ denotes the i-th key point of the 3D source data and $v_j$ denotes a key point of the 3D target data corresponding to $l_i$.

In an embodiment, the 3D registration apparatus calculates a weighted matrix $\hat{B}$ about a plurality of key points included in the 3D source data according to the below Equation 3, as only an example.

$$\hat{B} = \theta B = \theta \begin{pmatrix} \beta_1 & & \\ & \ddots & \\ & & \beta_L \end{pmatrix} \quad \text{Equation 3}$$

In Equation 3, L denotes the number of key points, $\theta$ denotes a weight of a key point constraint, and $\beta$ denotes a reliability of a corresponding key point of the 3D source data.

In operation 260, the 3D registration apparatus performs 3D registration. In an embodiment, the 3D registration apparatus may perform rigid alignment and non-rigid alignment of 3D source data and 3D target data, and generates a transformation matrix between the aligned 3D source data and the 3D target data. The 3D registration apparatus may perform the 3D registration based on the generated transformation matrix. Further description related to operation 260 will be made below with reference to FIG. 4.

As noted, prior to performing operation 260, the 3D registration apparatus may adjust the position of the key point of 3D image data in operation 240 and calculate the reliability of the key point of the 3D image data in operation 250. Accordingly, in one or more embodiments, since the 3D registration apparatus performs the 3D registration of operation 260 based on the adjusted position and reliability of the key point, the correspondence relationship or the transformation relationship between the 3D source data and the 3D target data may be further accurately found.

Figure 3:
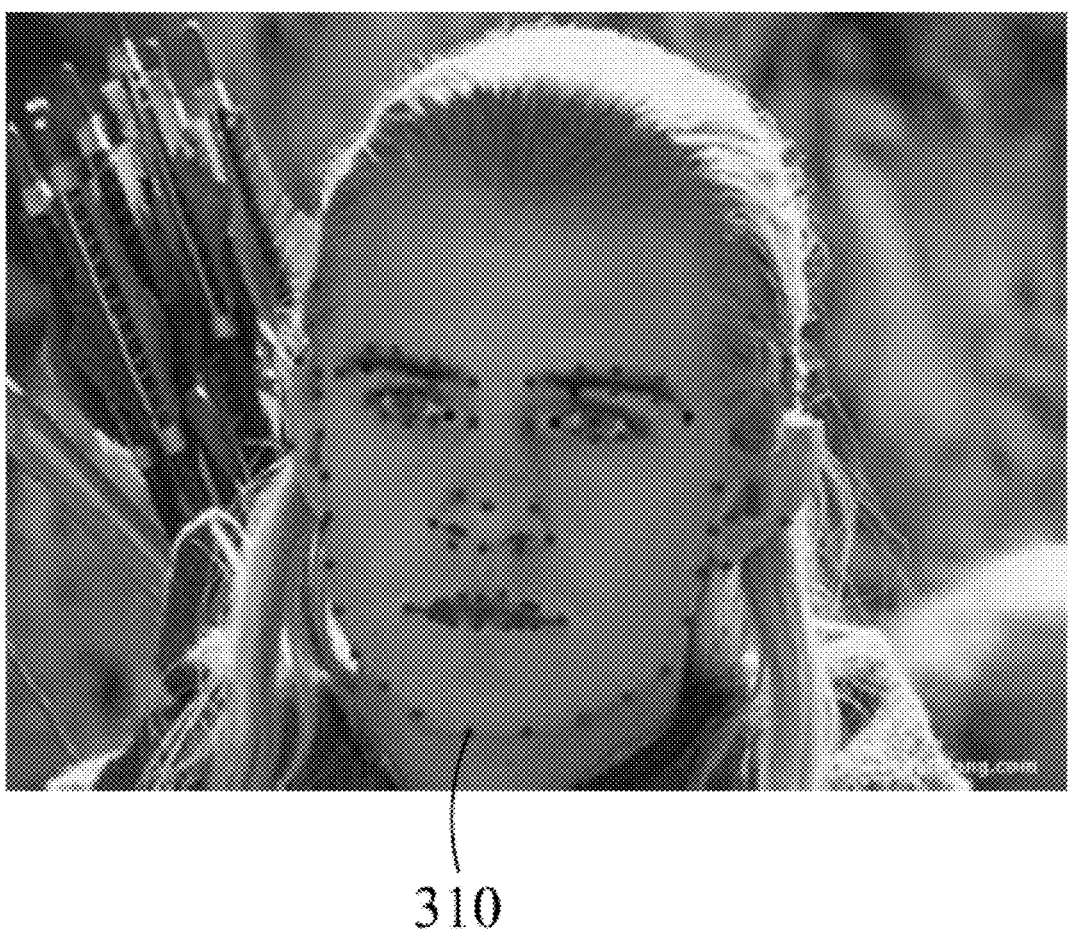
FIG. 3 illustrates an example of a key point that may be selected by a 3D registration apparatus according to one or more embodiments.

FIG. 3 illustrates an example of a key point that may be selected by a 3D registration apparatus according to one or more embodiments. Referring to FIG. 3, for example, the 3D registration apparatuses of FIGS. 6 and 7 may select a key point 310 from among a plurality of points included in 3D image data based on a geometric feature or a color feature of the 3D image data.

The description made above with operation 230 is applicable to an operation of the 3D registration apparatus that selects the key point 310. Thus, the 3D registration apparatus may select the key point 310 automatically or in response to an input of a user. The 3D registration apparatus may generate a feature vector that represents a geometric feature or a color feature of the key point 310. The generated feature vector may be used to calculate a feature distance or a reliability.

Figure 4:
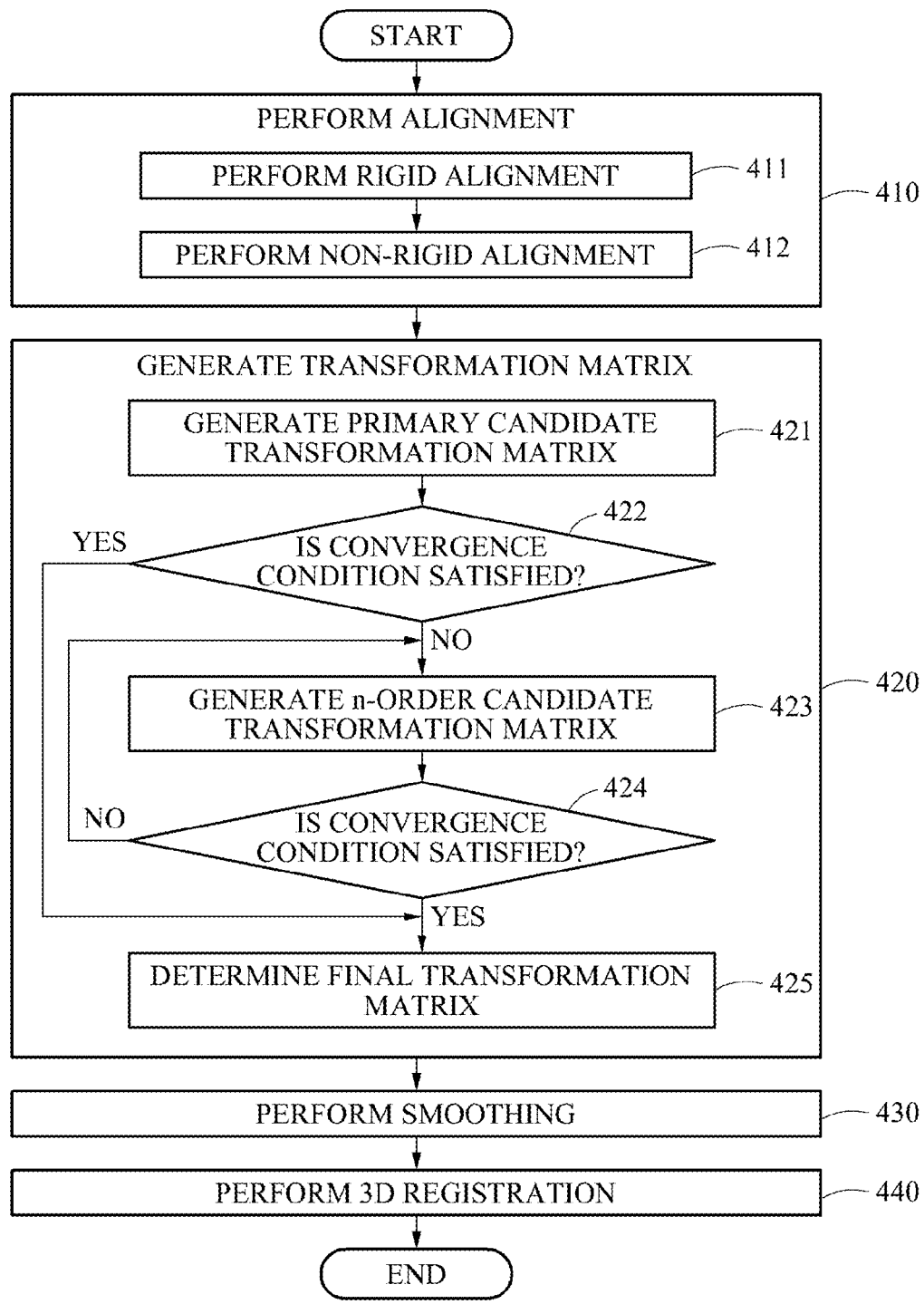
FIG. 4 is a flowchart illustrating aspects of a 3D registration method, according to one or more embodiments.

FIG. 4 is a flowchart illustrating aspects of a 3D registration method, according to one or more embodiments. As noted above, in one or more embodiments, the 3D registration apparatus may perform the 3D registration by calculating a reliability of a key point, such as discussed above with regard to operation 250, and then performing operations of FIG. 4.

For example, in operation 410, the 3D registration apparatus may align 3D source data based on a key point and 3D target data. In one or more embodiments, one or more of the key points referred to below in the operations of FIG. 4 may be adjusted key points having positions previously adjusted, such as based operation 240 of FIG. 2.

In detail, in operation 411, the 3D registration apparatus may perform rigid alignment of the 3D source data based on the key point and the 3D target data. Accordingly, the 3D registration apparatus may generate first transformed data representing an alignment of the 3D source data by performing the rigid alignment.

For example, the 3D registration apparatus may perform translation, rotation, or reflection of points included in the 3D source data by performing the rigid alignment. A distance between two points of the 3D source data may be the same as a distance before the rigid alignment is performed. The rigid alignment may be performed based on an iterative closest point (ICP) algorithm.

In operation 412, the 3D registration apparatus generates second transformed data, to further align the first transformed data, by performing non-rigid alignment of the first transformed data. That is, the second transformed data is generated based on the 3D source data, after a first alignment is performed. For example, the non-rigid alignment may include expansion, reduction, or nonlinear transformation. In one or more embodiments, since the 3D registration apparatus performs the non-rigid alignment as well as the rigid alignment, the accuracy of correspondence between the 3D target data and the 3D source data may increase, e.g., compared to when only one of the rigid or non-rigid alignments is performed.

In an embodiment, the 3D registration apparatus performs non-rigid alignment based on a smoothness or a key point. The 3D registration apparatus performs the non-rigid alignment based on the reliability of the key point of the 3D source data calculated in operation 250. For example, with respect to a transformation matrix $X=[X_1 \ldots X_n]^T$ from the first transformed data to the 3D target data, the 3D registration apparatus generates second transformed data based on the transformation matrix X that minimizes an energy function $E_1(X)$, such as expressed by the below Equation 4, for example.

$$E_1(X) := E_s(X) + \hat{B} E_l(X) \quad \text{Equation 4:}$$

In Equation 4, $X_i$ of $X=[X_1 \ldots X_n]^T$ denotes a 3×4 matrix and a transformation matrix for an i-th point of the 3D source data where n denotes the number of points, and $E_s(X)$ denotes a function with respect to the limit of smoothness and may be defined according to the below Equation 5, as only an example.

$$E_s(X) := \sum_{\{i,j\} \in \varepsilon} \|(X_i - X_j)\|_F^2 \quad \text{Equation 5}$$

Here, in Equation 5, $E_s(X)$ may be calculated based on a Frobenius norm of a transformation matrix $X_i$ of an i-th point and a transformation matrix $X_j$ of a j-th point with respect to the i-th point and the j-th point that are adjacent to each other. As described above, since the 3D registration apparatus generates the second transformed data based on the transformation matrix X that minimizes the energy function $E_1(x)$, Frobenius norms of $X_i$ and $X_j$ are to be minimized.

Returning to Equation 4, $\hat{B}$ denotes the weighted function of Equation 3, and $E_l(X)$ denotes a function with respect to the limit of a key point and may be defined according to the below Equation 6, as only an example.

$$E_l(X) := \sum_{\{v_i, l\} \in \mathcal{L}} \|(X_i v_i - l)\|^2 \quad \text{Equation 6}$$

In Equation 6, 1 denotes a key point of the 3D source data, and $v_i$ denotes a key point corresponding to 1 among key points included in the 3D target data. Here, the key points 1 and $v_i$ corresponding thereto configure a set $\mathcal{L}=\{(v_{i1}, 1_1), \ldots, (v_{il}, 1_l)\}$ in pairs. Since the 3D registration apparatus generates the second transformed data based on a transformation matrix X that minimizes an energy function $E_1(x)$, the key point v transformed based on the transformation matrix X is to be close to the key point 1.

In operation 420, the 3D registration apparatus generates a transformation matrix between the second transformed data and the 3D target data. In one or more embodiments, the 3D registration apparatus generates a plurality of candidate transformation matrices between the second transformed data and the 3D target data, and determines a final transformation matrix among the plurality of candidate transformation matrices based on a distance between the candidate transformation matrices.

For example, in operation 421, the 3D registration apparatus may generate a primary candidate transformation matrix that is a transformation matrix between the second transformed data and the 3D target data. An operation of generating such candidate transformation matrices will be described in greater detail with operation 423.

In operation 422, the 3D registration apparatus may determine whether the primary candidate transformation matrix satisfies a convergence condition. The convergence condition will be further described with operation 424. If the convergence condition is determined to be satisfied, the 3D registration apparatus performs operation 425. Accordingly, in such a case, the primary candidate transformation matrix may be determined to be the final transformation matrix. On the contrary, if the convergence condition is not satisfied, the 3D registration apparatus may perform operation 423.

In operation 423, the 3D registration apparatus generates an n-order transformation matrix. The 3D registration apparatus may use the 3D source data that is transformed based on an (n−1)-order transformation matrix, e.g., calculated in a previous implementation of operation 423, such as when operation 423 is repeated when a convergence condition is not met, or calculated based on the primary candidate transformation matrix.

For example, based on the convergence condition not being satisfied in operation 422, the 3D registration apparatus may generate a secondary transformation matrix using transformed data that is acquired by transforming second transformed data based on the primary candidate transformation matrix, e.g., using transformed data about the primary candidate transformation matrix. Likewise, the 3D registration apparatus may generate a tertiary transformation matrix using transformed data that is acquired by transforming the transformed data about the first candidate primary matrix based on the secondary candidate transformation matrix.

Thus, the 3D registration apparatus may generate an n-order candidate transformation matrix based on a transformation matrix X that minimizes an energy function E(X), such as expressed by the below Equation 7, for example.

$$E(X):=E_d(X)+\alpha_t E_s(X)+BE_l(X) \quad \text{Equation 7:}$$

In Equation 7, $E_s(X)$ denotes the function with respect to the limit of smoothness and may be defined as Equation 5. $E_l(X)$ denotes the function with respect to the limit of the key point and may be defined as Equation 6.

Further, $\alpha_t$ denotes a weighted coefficient of $E_s(X)$ and B denotes a weighted coefficient of $E_l(X)$. In one example, to prevent a calculation of a local optimal solution, the 3D registration apparatus may gradually decrease the weighted coefficient $\alpha_t$ of Equation 7. That is, in $\alpha_t \in \{\alpha_1, \ldots, \alpha_m\}$, $\alpha_1, \ldots, \alpha_m$ denote preset weighted coefficients and a relationship of $\alpha_t > \alpha_{t+1}$ may be established. The 3D registration apparatus may generate the n-order candidate transformation matrix using $\alpha_n$.

In Equation 7, $E_d(X)$ denotes a function with respect to the limit of a distance between a point of 3D source data that is transformed based on an (n−1)-order transformation matrix and a point of 3D target data corresponding thereto. $E_d(X)$ may be defined according to the below Equation 8, as only an example.

$$E_d(X) := \sum_{v_i \in \varphi} w_i dist^2(\mathcal{T}, X_i^j v_i) \quad \text{Equation 8}$$

In Equation 8, $\varphi$ denotes a set of points of the 3D source image data and $X_i^j$ denotes a transformation matrix of an i-th point of the 3D source data in a j-order candidate transformation matrix where j=n−1. Further, $\mathcal{T}$ denotes the 3D target data and dist denotes a distance between a position of a point $v_i$ of the 3D source data that is transformed based on the transformation matrix $X_i^j$ and a position of a point of the 3D target data corresponding thereto. In addition, $w_i$ denotes a binary parameter and if a point of the 3D target data corresponding to $X_i^j v_i$ is present, $w_i=1$ and if the point is absent, $w_i=0$.

In an example in which a difference between 3D source data and 3D target data is relatively great and a transformation matrix is calculated by comparing a key point of the 3D source data and a key point of the 3D target data corresponding thereto, a difference between a transformation result of the key point of the 3D source data and a transformation result of a neighbor point adjacent to the key point may be great.

Accordingly, in one or more embodiments, the 3D registration apparatus may overcome the above issue, of the potentially great difference between the transformation result of the 3D source and the transformation result of the neighbor point, by additionally using other points in addition to a key point. As only an example, the 3D registration apparatus may calculate an n-order transformation matrix by additionally using the below Equation 9.

$$|X_u^{(e)} - X_{i_m}^{(e)}| \leq \rho(v_u, v_{i_m}) \quad \text{Equation 9:}$$

In Equation 9, $X_u^{(e)}$ denotes an e-th element value of a transformation matrix with respect to a u-th point of the 3D source data that is transformed based on the n-order transformation matrix, and $X_{i_m}^{(e)}$ denotes an e-th element value of a transformation matrix with respect to an $i_m$-th point, that is, an m-th key point of a transformation matrix with respect to the u-th point of the 3D source data that is transformed based on the n-order transformation matrix. In addition, $v_u$ denotes a point that is included in a neighbor area of $v_{i_m}$ and $v_{i_m}$ denotes an m-th key point, that is, an $i_m$-th point of the 3D source data. $\rho(v_u, v_{i_m})$ may be proportional to a distance between $v_u$ and $v_{i_m}$.

Accordingly, in one or more embodiments, since the 3D registration apparatus calculates a transformation matrix based on a neighbor area of a key point, a difference between a transformation result of a key point of the 3D source data and a transformation result of a neighbor point adjacent to the key point may be reduced. Accordingly, with this, the accuracy of the performed 3D registration may be enhanced.

In operation 424, the 3D registration apparatus may determine whether or which of the n-order transformation matrix satisfies the convergence condition. As only an example, if the below Equation 10 is satisfied, the 3D registration apparatus may determine that the n-order transformation matrix has satisfied the convergence condition.

$$\|X^n - X^{n-1}\| < \delta$$ Equation 10:

In Equation 10, $X^{n-1}$ denotes an (n−1)-order transformation matrix, $X^n$ denotes the n-order transformation matrix, and $\delta$ denotes a preset iteration stop limit value. If the convergence condition is determined to not be satisfied, the 3D registration apparatus may regenerate the candidate transformation matrix by returning to operation 423. Accordingly, an (n+1)-order candidate transformation matrix to be calculated may refer to the n-order transformation matrix and transformed data that is transformed based on the n-order transformation matrix.

On the contrary, if the convergence condition is determined to be satisfied in operation 424, the 3D registration apparatus may determine that the corresponding n-order transformation matrix is the final transformation matrix in operation 425.

In operation 430, the 3D registration apparatus may perform smoothing of the transformation matrix. For example, the 3D registration apparatus may perform smoothing based on a smoothness and a distance between a key point of the 3D source data and a key point of the 3D target data corresponding thereto. In particular, as an example, the 3D registration apparatus may use third or final transformed data that is transformed from the 3D source data based on the transformation matrix generated in operation 420. In an embodiment, the 3D registration apparatus performs such smoothing based on a transformation matrix X that minimizes an energy function $E_2(X)$ as expressed by the below Equation 11, as only an example.

$$E_2(X) := E_d(X) + \hat{\alpha} E_s(X)$$ Equation 11:

In Equation 11, $\hat{\alpha}$ denotes a weighted coefficient of $E_s(X)$ that is the function with respect to the limit of smoothness. In addition, $E_s(X)$ denotes a function with respect to the limit of smoothness and may be defined by Equation 5. $E_d(X)$ denotes a function with respect to the limit of a distance between a point of third transformed data and a point of 3D target data corresponding thereto and may be defined by Equation 8.

In operation 440, the 3D registration apparatus may implement the 3D registration with respect to the 3D source data and the 3D target data. The 3D registration apparatus may implement the 3D registration based on the smoothed transformation matrix X that minimizes $E_2(X)$. As only an example, the 3D registration may include generating a transformed version of the 3D source data that is matched with the 3D target data, and output the transformed 3D source data. The output could be to any of the memories 620 or 720 respectively of the 3D registration apparatuses of FIGS. 6 and 7 and/or to exterior user interfaces, such as a display, or to other devices or components for use in further processing, such as a reconfigured displayed object or scene, to identify and model a human face, robot navigation, object identification, and the like, depending on embodiment.

Figure 5A:
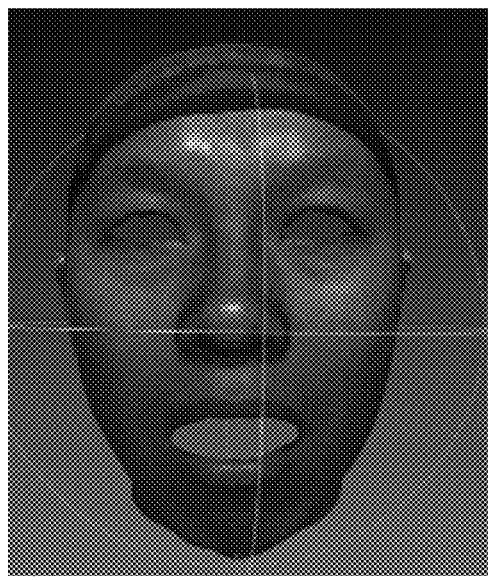
FIGS. 5A and 5B illustrate example results of 3D registration performed by an Optimal Step non-rigid Iterative Closest Point (OSICP) 3D registration technique.
Figure 5B:
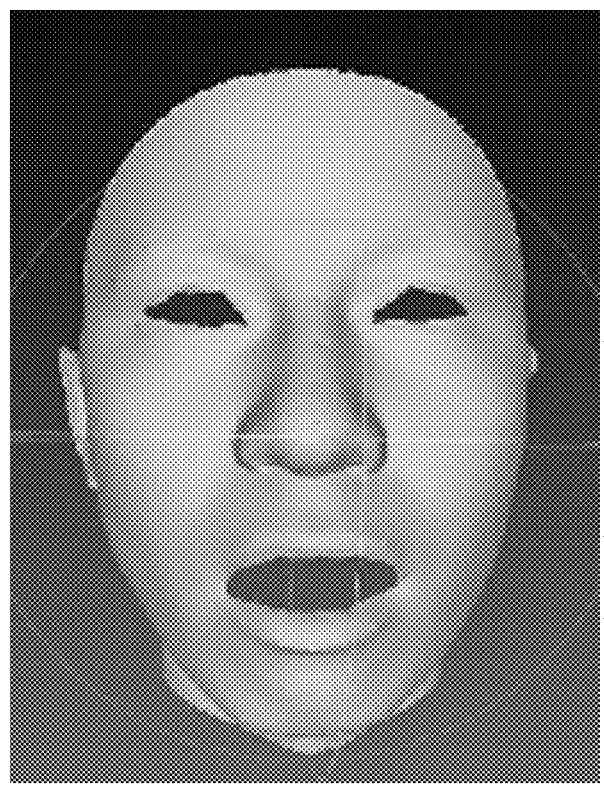
Figure 5C:
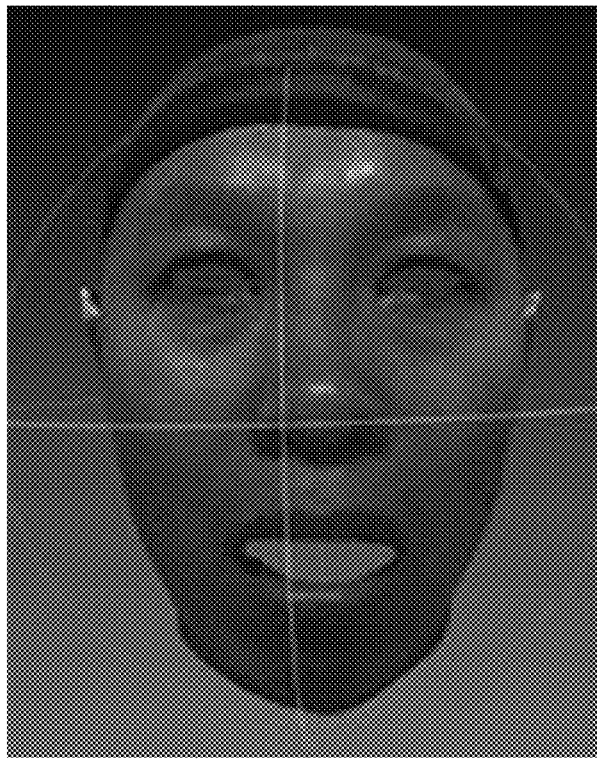
FIGS. 5C and 5D illustrate example results of 3D registration performed by a 3D registration apparatus according to one or more embodiments.
Figure 5D:
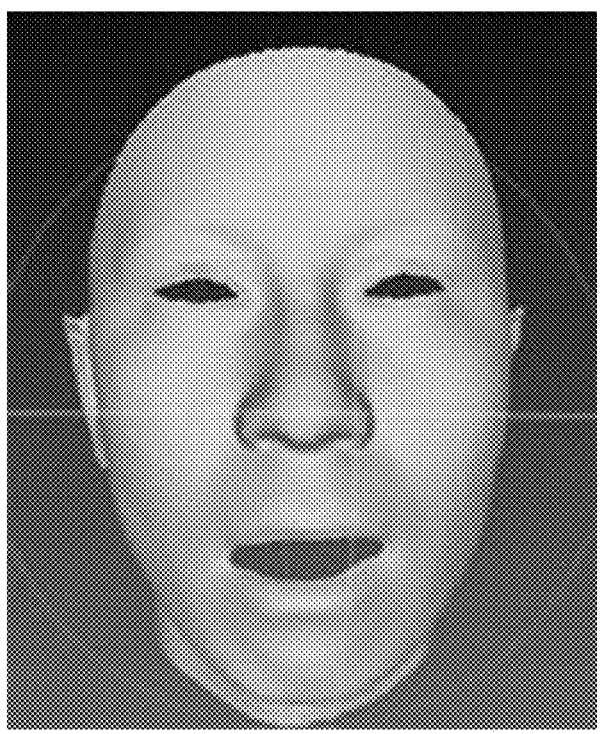

FIGS. 5A and 5B illustrate example results of 3D registration performed by an Optimal Step non-rigid Iterative Closest Point (OSICP) 3D registration technique, while FIGS. 5C and 5D illustrate example results of 3D registration performed by a 3D registration apparatus according to one or more embodiments. In these examples, the respective 3D registration apparatuses performed respective 3D registration between the 3D source data of FIG. 1A and the 3D target data of FIGS. 1B and 1C, based on the 3D target data of FIGS. 1B and 1C. FIGS. 5A and 5B illustrate examples of the resultant 3D source data that is aligned as a result of performing the OSICP 3D registration technique, while FIGS. 5C and 5D illustrate examples of the resultant 3D source data that is aligned as a result of performing 3D registration according to an embodiment.

Accordingly, as noted, FIGS. 5A and 5B illustrate a result acquired by performing the OSICP 3D registration technique, demonstrating the 3D source data of FIG. 1A being aligned based on the result of the OSICP 3D registration technique. In FIG. 5A, a texture is represented on a curved surface. In FIG. 5B, the texture has been removed and only the curved surface is represented.

FIGS. 5C and 5D illustrate examples of the 3D source data that is aligned based on a 3D registration according to an embodiment, such as performed by a 3D registration apparatus according to one or more embodiments. In FIG. 5C, a texture is represented on a curved surface. In FIG. 5D, the texture has been removed and only the curved surface is represented.

Referring to FIGS. 5A through 5D, when aligning the 3D source data based on the respective 3D registration, the 3D source data may be respectively aligned to be in a shape of the 3D target data. However, comparing key points around eyes, a nose, and lips in FIG. 5B to key points around eyes, a nose, and lips in FIG. 5D, it can be seen that the 3D registration apparatus according to one or more embodiments has aligned the key points more precisely compared to the OSICP technique.

A result of the OSICP 3D registration technique may be compared to a result of a 3D registration according to an embodiment by comparing respective quantization values acquired by calculating a matching level between the original 3D target data and the respectively aligned 3D source data. For example, a quantization value of smoothness and a quantization value about data matching may be respectively calculated and used for comparison.

A displacement between each point and a point of a neighbor area corresponding thereto may be calculated and an average displacement of all the points may be defined as a quantization level of smoothness. The quantization level of smoothness may decrease according to an increase in the accuracy of correspondence between the 3D source data and the 3D target data.

A distance between a point of the 3D source data and a point of the 3D target data corresponding thereto may be calculated and an average distance for all the points may be defined as the quantization level about data matching. The quantization value about data matching may decrease according to an increase in the accuracy of correspondence between the 3D source data and the 3D target data.

Accordingly, the below Table 1 shows the result of such a comparison between the OSICP 3D registration technique and a 3D registration according to an embodiment, using these respectively determined quantization values of smoothness and quantization values about data matching.

TABLE 1

| Technique | Quantization value of smoothness | Quantization value about data matching |
|---|---|---|
| OSICP | 0.3361 | 0.6486 |
| 3D registration embodiment | 0.3152 | 0.6096 |

Referring to Table 1, it can be seen that a correspondence relationship based on a 3D registration according to an embodiment is more precise compared to the correspondence relationship based on the OSICP 3D registration technique.

In addition to the apparatuses, units, modules, elements, devices, and other components of FIGS. 6 and 7 being hardware elements, any of which may implement any of the methods of FIGS. 1-4 and 5C-5D, as only examples, the methods of FIGS. 1-4 and 5C-5D may be implemented by hardware components, including any above discussed example hardware elements that are included in an electronic device embodiment. Examples of hardware components include, as only examples, resistors, capacitors, inductors, power supplies, frequency generators, operational amplifiers, power amplifiers, low-pass filters, high-pass filters, band-pass filters, analog-to-digital converters, digital-to-analog converters, controllers, sensors, generators, memory, drivers, circuitry, and/or any other electronic components known to one of ordinary skill in the art, configured to implement any of the above described methods of FIGS. 1-4 and 5C-5D, for example. In one or more examples, the hardware components are implemented by one or more processing devices, or processors, or computers. A processing device, processor, or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processing device, processor, or computer includes, or is connected to, one or more memories storing computer readable code, instructions, or software that are executed by the processing device, processor, or computer and that may control the processing device, processor, or computer to implement one or more methods described herein. Hardware components implemented by a processing device, processor, or computer, e.g., by implementing computer execute code, instructions, or software, such as an operating system (OS) and one or more software applications that run on the OS, may perform the operations described herein with respect to FIGS. 1-4 and 5C-5D, as only an example. The hardware components also access, manipulate, process, create, and store data in response to execution of the instructions or software. For simplicity, the singular term "processing device", "processor", or "computer" may be used in the description of the examples described herein, but in other examples multiple processing devices, processors, or computers are used, or a processing device, processor, or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, remote processing environments, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing. In addition, any connecting lines or connectors shown in the various above referred to apparatus figures are intended to represent example functional relationships and/or physical or logical couplings between the various hardware elements, with many alternative or additional functional relationships, physical connections, or logical connections may be present in a corresponding device embodiment.

The methods illustrated in FIGS. 1-4 and 5C-5D that perform the operations described herein may be performed by a processing device, processor, or a computer as described above executing processor or computer readable code, instructions, or software to perform the operations described herein.

Processor or computer readable code, instructions, or software to control a processing device, processor, or computer to implement the hardware components and perform the methods as described above may be written as computer programs, code segments, instructions or any combination thereof, for individually or collectively instructing or configuring the processing device, processor, or computer to operate as a machine or special-purpose computer to perform the operations performed by the hardware components and the methods as described above. In one example, the processor or computer readable code, instructions, or software include machine code that is directly executed by the processing device, processor, or computer, such as machine code produced by a compiler. In another example, the processor or computer readable code, instructions, or software include higher-level code that is executed by the processing device, processor, or computer using an interpreter, such as implemented with any programming or scripting language such as C, C++, Java, assembler, or the like, with the various algorithms being implemented with any combination of data structures, objects, processes, routines or other programming elements. Based on the disclosure herein, and after an understanding of the same, programmers of ordinary skill in the art can readily write the processor or computer readable code, instructions, or software based on the block diagrams and the flow charts illustrated in the drawings and the corresponding descriptions in the specification, which disclose algorithms for performing the operations performed by the hardware components and the methods as described above.

The processor or computer readable code, instructions, or software to control a processing device, processor, or computer to implement the hardware components, such as discussed with regard to any of FIGS. 6 and 7, and perform the methods as described above with regard to any of FIGS. 1-4 and 5C-5D, and any associated data, data files, and data structures, are recorded, stored, or fixed in or on one or more non-transitory computer-readable storage media. Examples of a non-transitory processor or computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the processor or computer readable code, instructions, or software and any associated data, data files, and data structures in a non-transitory manner and providing the processor or computer readable code, instructions, or software and any associated data, data files, and data structures to a processing device, processor, or computer so that the processing device, processor, or computer can execute the instructions. In one example, the processor or computer readable code, instructions, or software and any associated data, data files, and data structures are distributed over network-coupled computer systems so that the instructions and software and any associated data, data files, and data structures are stored, accessed, and executed in a distributed fashion by the processing device, processor, or computer.

As a non-exhaustive example only, and in addition to any of the above explanations of potential hardware implementations of the 3D registration apparatus, an electronic device embodiment herein, such as described above with regard to any of FIGS. 6 and 7, and/or configured to implement the methods described with regard to any of FIGS. 1-4 and 5C-5D, may also be a mobile device, such as a cellular phone, a smart phone, a wearable smart device, a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is not limited by the detailed description, but further supported by the claims and their equivalents, and all variations within the scope of the claims and their equivalents are to be construed as being included in the disclosure.

What is claimed is:

1. A three-dimensional (3D) registration method for registration between 3D source data and 3D target data, the method comprising:
   selecting a key point from among plural points included in the 3D target data, based on a geometric feature or a color feature of each of the plural points;
   adjusting a position of the selected key point of the 3D target data, to generate adjusted 3D target data, based on features of, or a distance between, a key point of the 3D source data and the selected key point of the 3D target data;
   calculating reliabilities of plural key points of the 3D source data based on respective features of plural key points of the adjusted 3D target data determined to correspond to the plural key points of the 3D source data; and
   generating 3D registration data by performing 3D registration between the 3D source data and the adjusted 3D target data based on the calculated reliabilities, for aligning the 3D source data to match the 3D target data,
   wherein the adjusting the position comprises,
   identifying a point, in a neighbor area of the selected key point of the 3D target data, based on a feature distance between the point and a key point of the 3D source data corresponds to the selected key point of the 3D target data; and
   adjusting the position of the selected key point of the 3D target data to be a position of the identified point,
   and wherein the reliability is determined based on the feature distance between the key point of the 3D source data and key point of the 3D target data, and the reliability and the feature distance are inversely proportional to each other.

2. The method of claim 1, wherein the selecting of the key point comprises generating feature vectors based on respectively determined geometric features or color features of key points of the 3D target data, and selecting the key point based on at least one of the generated feature vectors.

3. A method for three-dimensional (3D) registration, the method comprising:
   selecting a key point from among plural points included in 3D target data, based on a geometric feature or a color feature of each of the plural points;
   adjusting a position of the selected key point of the 3D target data based on features of, or a distance between, a key point of 3D source data and the selected key point of the 3D target data;
   calculating reliabilities of plural key points of 3D source data based on respective features of plural key points of the 3D target data determined to correspond to the plural key points of the 3D source data; and
   generating 3D registration data by performing 3D registration between the 3D source data and the 3D target data based on the calculated reliabilities, for aligning the 3D source data to match the 3D target data,
   wherein the adjusting of the position comprises:
   calculating a feature distance between a point present in a neighbor area of the selected key point of the 3D target data and the key point of the 3D source data, based on a determined geometric feature or a color feature of the selected key point; and
   adjusting the position of the selected key point based on a position of a point of the 3D source data corresponding to a determined minima of the feature distance,
   and wherein the reliability is determined based on the feature distance between the key point of the 3D source data and key point of the 3D target data, and the reliability and the feature distance are inversely proportional to each other.

4. The method of claim 1, wherein the calculating of the reliabilities comprises:
   calculating respective feature distances, based on geometric or color features, between the plural key points of the 3D source data and the plural key points of the adjusted 3D target data; and
   calculating respective reliabilities based on the respective feature distances.

5. The method of claim 1, further comprising:
   aligning the 3D source data based on at least one key point of the adjusted 3D target data;
   generating a transformation matrix between the aligned 3D source data and the adjusted 3D target data; and
   generating the 3D registration data by performing the 3D registration between the aligned 3D source data and the adjusted 3D target data based on the transformation matrix.

6. The method of claim 1, wherein the aligning of the 3D source data comprises:
   generating first transformed data by performing rigid alignment of the 3D source data based on a smoothness or the at least one key point; and generating second transformed data by performing non-rigid alignment of the first transformed data based on at least one of the smoothness, the at least one key point, and the reliabilities.

7. The method of claim 6, wherein the generating of the transformation matrix comprises:
generating a primary candidate transformation matrix between the second transformed data and the adjusted 3D target data; and
determining a final transformation matrix among a plurality of secondary candidate transformation matrices, which are based on the primary candidate transformation matrix, based on respective distances between the plurality of secondary candidate transformation matrices.

8. The method of claim 7, further comprising:
generating one of the secondary candidate transformation matrices based on a distance between a point of the adjusted 3D target data and a point of the 3D source data that is transformed based on another one of the secondary candidate transformation matrices, a smoothness, or the at least one key point.

9. The method of claim 6, wherein the performing of the 3D registration comprises performing smoothing for the 3D source data based on a distance between a point of the 3D source data that is transformed based on the transformation matrix and a point of the adjusted 3D target data corresponding to the point of the 3D source data or a smoothness.

10. The method of claim 1, further comprising preprocessing at least one of the 3D source data and the 3D target data before the performing of the adjusting of the position of the selected key point, the preprocessing including any one or any combination of two or more of cutting, hole filling, outlier removing, and smoothing of the 3D source data and/or 3D target data.

11. The method of claim 1, wherein the performing of the 3D registration includes aligning the 3D source data with respect to the adjusted 3D target data, and determining a first transformation between the aligned 3D source data and the adjusted 3D target data in correspondence with:

$E_1(X):=E_s(X)+\hat{B}E_f(X),$ wherein X, as a matrix, represents the first transformation between the aligned 3D source data and the adjusted 3D target data when $E_1(X)$ is minimized, with $E_s(X)$ representing a function with respect to a limit of smoothness, $\hat{B}$ being a weighted matrix representing determined reliabilities of key points of the 3D source data, and $E_f(X)$ representing an energy function with respect to a mapping of key points of the 3D source data and key points of the adjusted 3D target data according to X.

12. The method of claim 11, wherein the aligning of the 3D source data is a rigid aligning of the 3D source date with respect to the adjusted 3D target data and the determining of the first transformation includes a non-rigid aligning for the 3D source data.

13. A three-dimensional (3D) registration method for registration between 3D source data and 3D target data, the method comprising:
acquiring first transformed data by performing rigid alignment of the 3D source data based on a key point and adjusted 3D target data, with the adjusted 3D target data including one or more key points with respective adjusted key point positions relative to corresponding key points of the 3D target data;

acquiring second transformed data by performing non-rigid alignment of the first transformed data based on the key point and the adjusted 3D target data;
generating a transformation matrix between the second transformed data and the adjusted 3D target data; and
generating 3D registration data by performing 3D registration between the 3D source data and the adjusted 3D target data based on the transformation matrix for aligning the 3D source data to match the 3D target data,
wherein the adjusted 3D target data is determined by identifying a point, and adjusting the position of the selected key point of the 3D target data to be a position of the identified point,
and wherein the identified point is present in a neighbor area of the selected key point of the 3D target data, and the identified point is determined based on a feature distance between the point and a key point of the 3D source data corresponds to the selected key point of the 3D target data;
and wherein the reliability is determined based on the feature distance between the key point of the 3D source data and key point of the 3D target data, and the reliability and the feature distance are inversely proportional to each other.

14. The method of claim 13, wherein the performing of the acquiring of the first transformed data, the acquiring of the second transformed data, generating of the transformation matrix, and generating of the 3D registration data are performed in a second registration phase of the registration, with the adjusted 3D target data having been generated, in a first registration phase of the registration, through an adjusting of a position of a selected key point of the 3D target data to generate the adjusted 3D target data, based on features of, or a distance between, a key point of the 3D source data and the selected key point of the 3D target data.

15. The method of claim 13, wherein the acquiring of the second transformed data comprises:
performing the non-rigid alignment based on a smoothness, a reliability of a key point of the 3D source data, or the key point, and
the reliability is calculated based on a feature of a key point of the adjusted 3D target data corresponding to the key point of the 3D source data.

16. The method of claim 13, wherein the generating of the transformation matrix comprises:
generating a primary candidate transformation matrix between the second transformed data and the adjusted 3D target data; and
determining a final transformation matrix among a plurality of secondary candidate transformation matrices, which are based on the generated primary candidate transformation matrix, based on respective distances between the plurality of secondary candidate transformation matrices.

17. The method of claim 16, further comprising generating one of the secondary candidate transformation matrices based on a distance between a point of the adjusted 3D target data and a point of the 3D source data that is transformed based on another one of the secondary candidate transformation matrices, a smoothness, or the key point.

18. The method of claim 13, wherein the performing of the 3D registration comprises performing smoothing for the 3D source data based on a distance between a point of the 3D source data that is transformed based on the transformation matrix and a point of the adjusted 3D target data corresponding to the point of the 3D source data or a smoothness.

19. An apparatus with three-dimensional (3D) registration, the apparatus comprising:
one or more processors configured, to perform a registration between 3D source data and 3D target data, to select a key point from among plural points included in the 3D target data, based on a geometric feature or a color feature of each of the plural points, to adjust a position of the selected key point of the 3D target data, to generate adjusted 3D target data, based on features of, or a distance between, a key point of the 3D source data and the selected key point of the 3D target data, to calculate reliabilities of plural key points of the 3D source data based on respective features of at least one key point of the adjusted 3D target data determined to correspond to the plural key points of the 3D source data, to generate 3D registration data by performing 3D registration between the 3D source data and the adjusted 3D target data based on the calculated reliabilities, representing a transformation of the 3D source data, as image data,
wherein the processors configured to,
identify a point, in a neighbor area of the selected key point of the 3D target data, based on a feature distance between the point and a key point of the 3D source data corresponds to the selected key point of the 3D target data; and
adjust the position of the selected key point of the 3D target data to be a position of the identified point,
and wherein the reliability is determined based on the feature distance between the key point of the 3D source data and key point of the 3D target data, and the reliability and the feature distance are inversely proportional to each other.

20. The apparatus of claim 19, wherein the one or more processors, or another processor of the apparatus, are configured to perform preprocessing of the 3D source data and the 3D target data before the performing of the adjusting of the position of the selected key point, the preprocessing including any one or any combination of two or more of cutting, hole filling, outlier removing, and smoothing of the 3D source data and/or 3D target data.

21. The method of claim 1, wherein the adjusting of the position comprises:
calculating a feature distance between a point present in a neighbor area of the selected key point of the 3D target data and the key point of the 3D source data, based on a determined geometric feature or a color feature of the selected key point; and
adjusting the position of the selected key point based on a position of a point of the 3D source data corresponding to a determined minima of the feature distance.

22. The method of claim 1, further comprising receiving the 3D source data and the 3D target data as respective 3D image data, wherein the respective 3D image data are each in a form of a point cloud, a depth map, or a 3D grid.

23. The apparatus of claim 19, wherein, to perform the adjusting of the position, the one or more processors are configured to:
calculate a feature distance between a point present in an a neighbor area of the selected key point of the 3D target data and the key point of the 3D source data, based on a determined geometric feature or a color feature of the selected key point; and
adjusting the position of the selected key point based on a position of a point of the 3D source data corresponding to a determined minima of the feature distance.

24. The apparatus of claim 19, wherein the one or more processors are further configured to receive the 3D source data and the 3D target data as respective 3D image data, wherein the respective 3D image data are each in a form of a point cloud, a depth map, or a 3D grid.

25. The method of claim 14, wherein the selected key point is a point that is selected in the first registration phase from among plural points included in the 3D target data and the 3D source data, based on respective geometric features or color features of each of the plural points, with the key point in the second registration phase corresponding to the selected key point.

26. A processor implemented three-dimensional (3D) registration method for registration between 3D source data and 3D target data, the method comprising:
performing a first registration phase including adjusting key point positions of the 3D source data and/or the 3D target data based on respective features of, or distances between, key points of the 3D source data and corresponding key points of 3D target data; and
performing a second registration phase, dependent on the adjusted key point positions, including:
calculating reliabilities of plural key points of the 3D source data based on respective features of plural key points of the 3D target data determined to correspond to the plural key points of the 3D source data; and
generating 3D registration data by performing 3D registration between the 3D source data and the 3D target data based on the calculated reliabilities, for aligning the 3D source data to match the 3D target data,
wherein the adjusting key point positions of the 3D target data comprises,
identifying a point, in a neighbor area of the selected key point of the 3D target data, based on a feature distance between the point and a key point of the 3D source data corresponds to the selected key point of the 3D target data; and
adjusting the position of the selected key point of the 3D target data to be a position of the identified point,
and wherein the reliability is determined based on the feature distance between the key point of the 3D source data and key point of the 3D target data, and the reliability and the feature distance are inversely proportional to each other.

27. The method of claim 26, wherein the first registration phase further comprises preprocessing of the 3D source data and the 3D target data before the performing of the adjusting of the key point positions, the preprocessing including any one or any combination of two or more of cutting, hole filling, outlier removing, and smoothing of the 3D source data and/or 3D target data.

28. The method of claim 26, wherein the first registration phase further includes:
receiving the 3D source data and the 3D target data as respective 3D image data, wherein the respective 3D image data are each in a form of a point cloud, a depth map, or a 3D grid.

29. The method of claim 26, wherein the adjusting of the key point positions comprises:
calculating a feature distance between a point present in an a neighbor area of a key point of the 3D target data and a key point of the 3D source data, based on a determined geometric feature or a color feature of the key point of the 3D target data; and
adjusting a key point position, of the key point positions, for the key point of the 3D target data based on a position of a point of the 3D source data corresponding to a determined minima of the feature distance.

30. The method of claim 26, wherein, dependent on the adjusted key point positions, the generating of the 3D registration data comprises
- acquiring first transformed data by performing rigid alignment of the 3D source data based on a key point and the 3D target data;
- acquiring second transformed data by performing non-rigid alignment of the first transformed data based on the key point and the 3D target data;
- generating a transformation matrix between the second transformed data and the 3D target data; and
- generating 3D registration data by performing 3D registration between the 3D source data and the 3D target data based on the transformation matrix for aligning the 3D source data to match the 3D target data.

* * * * *